United States Patent
Markworth et al.

(10) Patent No.: US 12,347,167 B2
(45) Date of Patent: Jul. 1, 2025

(54) WASTE DISPOSAL SYSTEM AND METHOD FOR DETECTING IMPURITIES IN WASTE CONTAINERS

(71) Applicant: c-trace GmbH, Bielefeld (DE)

(72) Inventors: Cedric Markworth, Bielefeld (DE); Stephan Vogt, Leopoldshohe (DE)

(73) Assignee: c-trace GmbH, Bielefield (DE)

( * ) Notice: Subject to any disclaimer, the term of this patent is extended or adjusted under 35 U.S.C. 154(b) by 483 days.

(21) Appl. No.: 17/985,233

(22) Filed: Nov. 11, 2022

(65) Prior Publication Data
US 2023/0154152 A1    May 18, 2023

(30) Foreign Application Priority Data
Nov. 16, 2021  (EP) .................................. 21208496

(51) Int. Cl.
*G06V 10/764* (2022.01)
*B65F 3/02* (2006.01)
(Continued)

(52) U.S. Cl.
CPC .............. *G06V 10/764* (2022.01); *B65F 3/02* (2013.01); *G06V 10/82* (2022.01); *G06V 20/56* (2022.01);
(Continued)

(58) Field of Classification Search
CPC ...... G06V 10/764; G06V 10/82; G06V 20/56; G06V 20/59; G06V 2201/06; G06V 20/52;
(Continued)

(56) References Cited

U.S. PATENT DOCUMENTS 5,964,258 A * 10/1999 Schoenbauer ........... B67D 7/02
                                                       141/83
7,313,464 B1 * 12/2007 Perreault ................ B25J 9/1666
                                                       700/262
(Continued)

FOREIGN PATENT DOCUMENTS

EP          3553698 A1    10/2019

OTHER PUBLICATIONS

"ZenRobotics Recycler—Robotic Sorting using Machine Learning"; Dr. Tuomas J. Lukka, Sensor Based Sorting 2014 (Year: 2014).*
(Continued)

*Primary Examiner* — Michael S Osinski
(74) *Attorney, Agent, or Firm* — Richard M. Goldberg

(57) ABSTRACT

A waste disposal system for contaminant detection in waste containers, includes a disposal vehicle having a waste collection room, an emptying device, adapted to receive a waste container in a receiving position and move it to an emptying position in which the contents of the waste container are emptied into the waste collection room, and a camera system, adapted to detect the contents of the waste container, and including a first camera to record at least one image of the contents of the waste container prior to emptying in a top view and a second camera for recording a sequence of images of the contents of the waste container during the emptying, and a data processing unit for analysis of images of the first camera and/or the second camera, the analysis involving classification of the images in terms of identified contents by means of a neural network.

20 Claims, 3 Drawing Sheets

(51) Int. Cl.
*G06V 10/82* (2022.01)
*G06V 20/56* (2022.01)
*G06V 20/59* (2022.01)
*H04N 23/90* (2023.01)

(52) U.S. Cl.
CPC ............ *G06V 20/59* (2022.01); *H04N 23/90* (2023.01); *B65F 2003/0263* (2013.01)

(58) Field of Classification Search
CPC .. B65F 3/02; B65F 2003/0263; B65F 1/1484; B65F 2210/128; B65F 2003/0279; H04N 23/90; G06T 7/001; G06T 2207/20084; G06T 2207/30232; G06T 2207/10016; G06Q 10/30; G06Q 10/08
See application file for complete search history.

(56) References Cited

U.S. PATENT DOCUMENTS

| | | | | |
|---|---|---|---|---|
| 7,421,112 B2* | 9/2008 | Calver | .................... | G01S 17/89 348/148 |
| 7,449,655 B2* | 11/2008 | Cowling | ............... | B07C 5/3425 209/579 |
| 8,185,277 B2* | 5/2012 | Flood | .................... | B65F 1/1484 701/50 |
| 12,046,026 B2* | 7/2024 | Di Febbo | ............. | G06V 10/757 |
| 12,254,403 B2* | 3/2025 | Armstrong | .......... | G06F 18/2193 |
| 2008/0061125 A1* | 3/2008 | Langlois | ................ | G06Q 10/08 340/572.1 |
| 2008/0061977 A1* | 3/2008 | Maruca | .............. | G06Q 10/0637 340/572.1 |
| 2009/0008298 A1* | 1/2009 | Studley | ................... | F23G 5/006 15/1 |
| 2009/0161907 A1* | 6/2009 | Healey | ...................... | B65F 1/14 340/666 |
| 2009/0321511 A1* | 12/2009 | Browne | ................ | H01M 10/54 705/308 |
| 2014/0214697 A1* | 7/2014 | McSweeney | .......... | G06Q 10/30 705/308 |
| 2014/0278630 A1* | 9/2014 | Gates | ................... | G06Q 10/047 705/7.13 |
| 2014/0379588 A1* | 12/2014 | Gates | ................... | G06T 7/0008 705/308 |
| 2015/0348252 A1* | 12/2015 | Mask | .................... | G06V 20/52 382/103 |
| 2018/0082279 A1* | 3/2018 | Vasgaard | ............. | G06Q 10/087 |
| 2018/0327183 A1* | 11/2018 | Peek | ........................ | E01H 5/061 |
| 2018/0353886 A1* | 12/2018 | Choi | ........................ | C03B 1/00 |
| 2019/0017982 A1* | 1/2019 | Lamberti | ............. | G01N 21/359 |
| 2019/0019167 A1* | 1/2019 | Candel | ...................... | B65F 3/14 |
| 2019/0130560 A1* | 5/2019 | Horowitz | ............... | G06V 10/82 |
| 2020/0034785 A1* | 1/2020 | Romano | ............... | B65F 1/0033 |
| 2020/0082167 A1* | 3/2020 | Shalom | .................. | G06N 3/045 |
| 2020/0193620 A1* | 6/2020 | Armstrong | ................ | G06T 7/97 |
| 2021/0158097 A1* | 5/2021 | Armstrong | ............. | G06N 3/045 |
| 2021/0158308 A1* | 5/2021 | Armstrong | ............. | G06Q 10/30 |
| 2024/0395006 A1* | 11/2024 | Swaroop | ................ | G06V 20/39 |

OTHER PUBLICATIONS

"DeepCounter: Using Deep Learning to Count Garbage Bags"; Kazuhiro Mikami, 2018 IEEE 24th International Conference on Embedded and Real-Time Computing Systems and Applications (RTCSA) (2018, pp. 1-10) (Year: 2018).*

* cited by examiner

WASTE DISPOSAL SYSTEM AND METHOD FOR DETECTING IMPURITIES IN WASTE CONTAINERS

BACKGROUND OF THE INVENTION

The present invention relates to a waste disposal system for contaminant detection in waste containers, according to the preamble of the claims, as well as a corresponding method.

Efficient waste disposal systems are an essential part of the circulating economy. It is of great importance that the wastes being disposed of are efficiently reused to the greatest possible extent. For this, it is necessary to distinguish recyclable contents of waste from contaminants which may be present in the wastes and to separate them cleanly from each other.

While in the past it was primarily necessary for those generating the wastes, such as households and industrial operations, to undertake themselves the separation of the wastes into individual contents and valuable materials, for some time now systems are also known in which the wastes are investigated for their contents during the disposal process, so that sorting mistakes can be identified. For example, EP 3 553 698 A1 discloses a system for detecting the components of wastes, in which a camera system is mounted on the disposal vehicle in which the individual waste containers are being emptied. The disposal vehicle is outfitted with a conventional device for receiving the waste container in a receiving position and moving it from this to an emptying position, in which the contents of the container are dumped into a waste collection room of the vehicle. The camera system comprises three different optical recording devices, a first optical recording device to record a 2D color image, a second optical recording device to record a plurality of 2D spectral images, and a third optical recording device to record a 3D image. Thanks to an image analysis by means of a neural network, it is possible to detect individual components of each waste container emptied and utilize this to optimize the processing of the wastes.

The drawback for this known system, however, is that the optical analysis of the wastes occurs only when the contents of the waste container are already in the waste collection room. Images of the waste are made only after the wastes are distributed on a surface provided for this purpose in the vehicle. Although a wrong sorting of the particular waste container can be determined at this time, it is not possible to prevent wrongly sorted wastes from getting into the waste collection room, e.g., by a dump stop which prevents an emptying in good time. Moreover, it is desirable to largely avoid any modification of the disposal vehicle itself, such as the aforementioned surface on which the contents of the waste containers need to be spread out. Finally, it is desirable to organize the waste disposal system such that individual containers are matched up with an evaluation of the quality of the wastes and assessed for the further waste management, for example, for accounting purposes or other personalized measures addressed directly to the waste producer, such as an informational or warning letter.

SUMMARY OF THE INVENTION

It is therefore the problem of the present invention to create a waste disposal system and a corresponding method in which the earliest possible individual checking of the waste quality of the individual waste containers can be done, even before their contents arrive in the waste collection room of the disposal vehicle, and to increase the accuracy of the detection of contaminants in the wastes.

This problem is solved according to the invention by a waste disposal system having the features of the claims as well as a corresponding method having the features of the claims.

The camera system of the waste disposal system according to the invention comprises a first camera and a second camera with different functions. The first camera serves for recording at least one image of the contents of the waste container prior to its being emptied in a top view. The second camera serves for recording a sequence of images of the contents of the waste container during its emptying. Thus, while the first camera represents the contents of the waste container statically, the second camera can record them dynamically during the dumping into the waste collection room, namely, as an image sequence or video sequence. A data processing unit serves for analysis of the images of the first camera and/or the second camera. This analysis involves a classification of the images in terms of contents by means of a neural network.

In this way, it is possible to identify contents of the wastes with the aid of the first camera even prior to the emptying and to distinguish contaminants, i.e., unwanted contents not correctly sorted from permitted, i.e., correctly sorted contents and to take steps if necessary to prevent an emptying of the contents in the waste collection room. Thanks to the automatic analysis, this identification of contaminants can be done without observation and intervention by an attendant. For example, a dump stop can be carried out automatically when a contaminant is identified in the wastes based on the analysis of an image of the first camera. An appropriate warning signal, for example, can then be issued. In this way, it is possible to prevent a contamination of the wastes already present in the waste collection room.

If this is not the case, a contaminant can possibly be identified by the second camera during the dumping, i.e., while the wastes drop into the waste collection room. Even if a contaminating of the wastes already present in the waste collection room can no longer be prevented, it is possible to calculate or estimate the contaminant fraction inside the waste collection room and at least prevent the overall contaminated wastes inside a disposal vehicle from getting into the further waste cycle. A combination of using the first camera and the second camera can thus improve the recycling quality and the recycling quota.

The neural network can be, for example, a trained "convolutional neural network" (CNN). This can perform the classification of an image based on image features, and in the context of the present invention it may be enough to classify an image in terms of whether or not it contains a contaminant. A more precise classification is possible, such as identifying the precise type of the contaminant (like "PVC") and a corresponding assignment of this to a particular contaminant class (like "plastics") is conceivable, but not absolutely necessary. Neither does a specific object (like a beverage container) need to be recognized and identified.

According to a preferred embodiment of the present invention, the data processing unit is adapted to classify the images in terms of whether an image contains or does not contain at least one contaminant, and if a contaminant is present to identify the waste container whose contents are depicted as a contaminated one.

Further preferably, the data processing unit, in event of identifying a contaminated waste container based on an image recorded by the first camera, is adapted to relay a signal to the emptying device, by which a movement of this waste container to the emptying position is terminated or prevented. In this way, it can be prevented that the contents of a contaminated waste container get into the waste collection room and contaminate the already collected wastes. Thus, a dump stop will be carried out. This can also be carried out before the movement of the waste container from the receiving position begins, i.e., already with the receiving of the waste container.

Further preferably, the data processing unit is adapted to determine the fraction of contaminants of the contents of a contaminated waste container. This may be a volume fraction of these contents or—given a classification of the contaminants in relation to the other contents—a weight fraction. This information may be used to decide whether the contaminant fraction exceeds a certain limit value, and only if this limit value is exceeded will a corresponding warning signal, a report, or the like be generated. Such a signal can also be used to carry out the dump stop described above, i.e., only upon exceeding a predetermined contaminant fraction in a waste container will its emptying into the waste collection room be prevented.

According to another preferred embodiment, the data processing unit is adapted to determine, from the contaminant fractions determined for already completed emptying of multiple waste containers, a cumulative contaminant fraction of the contents of the waste collection room. In this embodiment, for example, the images of the contents of the waste container recorded by the second camera during the emptying can serve for determining the contaminant fraction of the contents of an individual waste container. This can lead to more precise results, since the contents of the waste container during the emptying can fall entirely through the visual field of the second camera, which is not the case with the first camera. Even if a dump stop for an individual waste container can no longer be carried out, it makes sense to determine a cumulative contaminant fraction in the disposal vehicle in order to judge the sorting purity and thus the quality of the collected wastes. Various steps can then be taken, depending on the ascertained quality. For example, the driver of a disposal vehicle can be told, when the cumulative contaminant fraction exceeds a limit value, to drive the disposal vehicle to a different utilization site than was originally planned.

This shall be explained on the example of the disposal of bio-waste. Compostable waste is generally a desirable content in this case, while other non-compostable fractions, especially plastics, metal, and so forth, are undesirable contaminants. Thus, if the images of the first camera in top view reveal that a contaminant such as metal or plastic is contained in a waste container, at least to an unjustifiable degree, this waste container will be identified as being contaminated. If this is the case already based on images of the first camera, a dump stop can be initiated, so that the contaminated waste is prevented from getting into the wastes of already completed emptying events already collected in the waste collection room. If this identification occurs only with the aid of images of the second camera, i.e., during the emptying, the contaminant fraction can be determined more precisely qualitatively with these images, and it is possible to determine the cumulative contaminant fraction in the waste collection room and thus the waste quality in terms of a possible recycling based on the total of emptying events performed for multiple waste containers.

According to another preferred embodiment of the present invention, that the data processing unit is adapted to determine, from the fraction of emptying of contaminated waste containers in the total number of emptying events already performed, a cumulative contaminant fraction of the contents of the waste collection room. Thus, in this embodiment, the determination of the cumulative contaminant fraction is based on the numerical fraction of contaminated emptying events out of their total number. For example, it is possible to determine, when a particular number of contaminated emptying events has occurred, that the degree of contamination of the contents of the waste collection room is so high that it must undergo a separate disposal. In this case, once again, a corresponding warning signal is put out to the crew of the disposal vehicle.

Further preferably, the disposal vehicle comprises identification means for determining an identifier of a waste container. Such identification means may be, for example, an antenna for reading out an RFID transponder which is mounted on the waste container and contains its identity or that of its owner in encoded form. This identification code corresponds to the identifier which is read out by the identification means. In this way, it is possible to identify each individual waste container and thereby coordinate its owner with a waste producer.

Further preferably, the disposal vehicle comprises means for determining its geographical location and for generating corresponding location data, and the data processing unit is adapted to correlate the location data with the identifier of a waste container. The location data may involve in particular GPS data, which accurately reflect the position of the disposal vehicle. The correlation with the identifier of a waste container then also makes it possible to determine the position of this container, namely, when the container is coupled to the disposal vehicle, i.e., when it gets for example into the receiving position of the emptying device of the vehicle.

According to another preferred embodiment of the present invention, the waste disposal system comprises a central data management unit and means for communication between the central data management unit) and the data processing unit of the disposal vehicle, wherein the data processing unit is adapted to send location data and correlated identifiers of waste containers together with the respective contaminant fractions of the contents of the waste containers to the data management unit, and the data management unit is adapted to determine a geographical density distribution of the contaminant fractions. As already mentioned, a correlating of the location data with the identifiers of the waste container can furnish information as to which containers are found in which position. This, in turn, can be correlated with the contaminant fractions of the contents of these containers. As a result, the data management unit can thus determine which containers with which contaminant fractions are located at which positions within a geographical territory, i.e., along the driving route of the disposal vehicle, for example, which carries out an emptying of various waste containers in succession along this route.

The geographical density distribution of the contaminant fractions represents a kind of "heat map", which visualizes how the occurrence of contaminants is spatially distributed. This information can be used, for example, to identify geographical problem zones and to contact the owners of the waste containers, i.e., those causing the wastes, within these zones, for example in the form of informational or warning letters. Furthermore, it is also possible to contact individual parties causing waste separately. This is made possible by identifying waste containers with too high a contaminant fraction. The contaminant fraction can furthermore be included in the billing of the waste collection fees.

Further preferably, the data management unit is adapted to analyze images of the first camera and/or the second camera, this analysis involving a classification of the images in terms of identified contents by means of a further neural network. This may differ, e.g., in architecture and resource requirements from the neural network of the data processing unit of the disposal vehicle. It is also conceivable for the further neural network of the central data management unit to rely on a different set of training data, e.g., a more recent set, than the neural network of the data processing unit of the disposal vehicle or to incorporate attributes from other sources in the decision making. The additional analysis by the central data management unit serves for verification of the result of the analysis by the data processing unit of the disposal vehicle.

The invention moreover relates to a method for contaminant detection in waste containers, involving the following steps:

receiving of a waste container by a disposal vehicle in a receiving position, recording of at least one image of the contents of the waste container in the receiving position by a first camera in a top view, moving of the waste container to an emptying position, in which the contents of the waste container are emptied into a waste collection room of the disposal vehicle, and recording of a sequence of images of the contents of the waste container during the emptying by a second camera, analysis of the images of the first camera and/or the second camera, involving a classification of the images in terms of contents by means of a neural network.

Preferably, the images are classified in terms of whether or not an image contains at least one contaminant, and if a contaminant is present then the waste container whose contents are depicted is identified as a contaminated one.

Further preferably, in event of the identifying of a contaminated waste container based on an image recorded by the first camera a movement of this waste container to the emptying position is terminated or prevented. This corresponds to the dump stop described above, which prevents the contents of a contaminated waste container from getting into the contents of the already emptied waste containers in the waste collection room of the disposal vehicle.

Further preferably, the contaminant fraction of the contents of a contaminated waste container is determined. This may be, for example, a volume fraction or a weight fraction. This determination may also involve an estimation.

Further preferably, a cumulative contaminant fraction of the contents of the waste collection room is determined from the ascertained contaminant fractions of emptying events already performed for multiple waste containers. It can be determined in this case whether the cumulative contaminant fraction exceeds a limit value and in the event of such an exceeding of the limit value a corresponding signal is put out to the crew of the disposal vehicle.

Further preferably, a cumulative contaminant fraction of the contents of the waste collection room is determined from the fraction of emptying of contaminated waste containers out of the total number of emptying events already performed.

Further preferably, one identifier of a waste container is determined, by which the waste container is identified. This can be, for example, an identification by means of a RFID transponder, a corresponding RFID transponder being arranged on the waste container and an antenna for reading the signal of the RFID transponder being provided on the disposal vehicle.

Further preferably, the geographical location of the disposal vehicle is determined and location data corresponding to this geographical location are correlated with the identifier of the waste container.

Further preferably, location data and correlated identifiers of waste containers are sent along with the respective contaminant fractions of the contents of the waste containers to a central data management unit and a geographical density distribution of the contaminant fractions is ascertained.

Further preferably, the central data management unit performs an analysis of the images of the first camera and/or the second camera by means of a further neural network, involving a classification of the images in terms of identified contents, in order to verify the result of the analysis of these images by the neural network of the disposal vehicle.

The image or images will be saved in order to serve as proof of evidence for the contaminant.

BRIEF DESCRIPTION OF THE DRAWINGS

In the following, preferred embodiments of the present invention will be explained more closely with the aid of the drawing.

DETAILED DESCRIPTION

Figure 1:
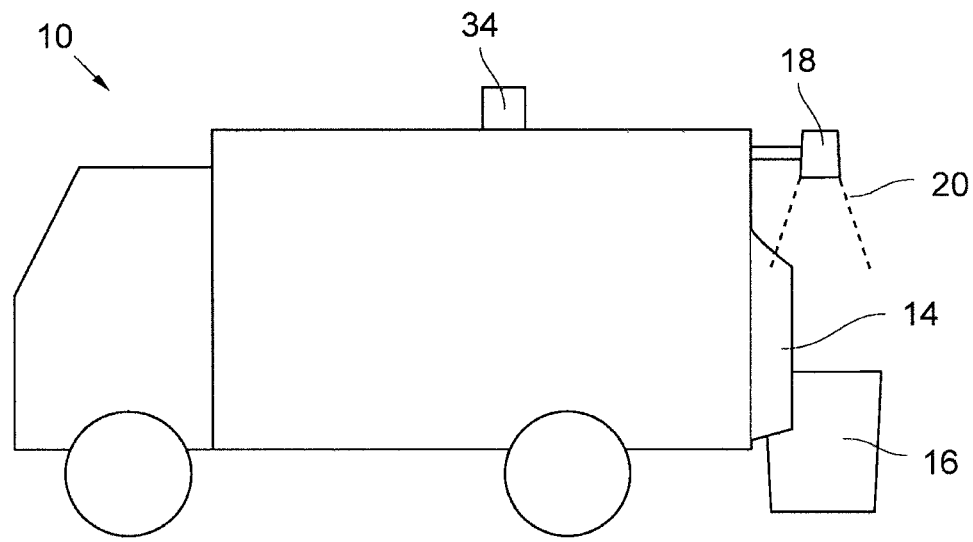
FIG. 1 is a schematic representation of a disposal vehicle of one embodiment of the waste disposal system according to the invention in a side view.

The disposal vehicle 10 shown in FIG. 1 is part of a waste disposal system according to the invention for contaminant detection in waste containers. The disposal vehicle 10 comprises on the inside a waste collection room 12 and at its rear (right side in FIG. 1) an emptying device 14, which is designed to receive a waste container 16 and move it into an emptying position. FIG. 1 shows the receiving position of the waste container 16 in the emptying device 14, in which the waste container 16 is suspended in usual manner with its edge on a receiver provided for this, such as a hook or the like of the emptying device 14. For the moving of the waste container 16 from this receiving position (FIG. 1) to the emptying position (FIG. 3), the emptying device 14 has appropriate lifting means, which can be mechanically or hydraulically operated, for example. As an example, a disposal vehicle 10 is shown here as a rear-end loader, but the invention also allows the use of side loaders with no problem. Moreover, multiple emptying devices 14 can also be present for multiple waste containers 16.

In the receiving position in FIG. 1, the waste container 16 stands basically upright and is opened. Above the waste container 16 there is arranged a first camera 18, the visual field 20 of which is directed downward, so that the interior of the waste container 16 is surveyed. In this way, the first camera 18 can take a picture of the contents of the opened waste container 16 before performing the emptying.

Figure 2:
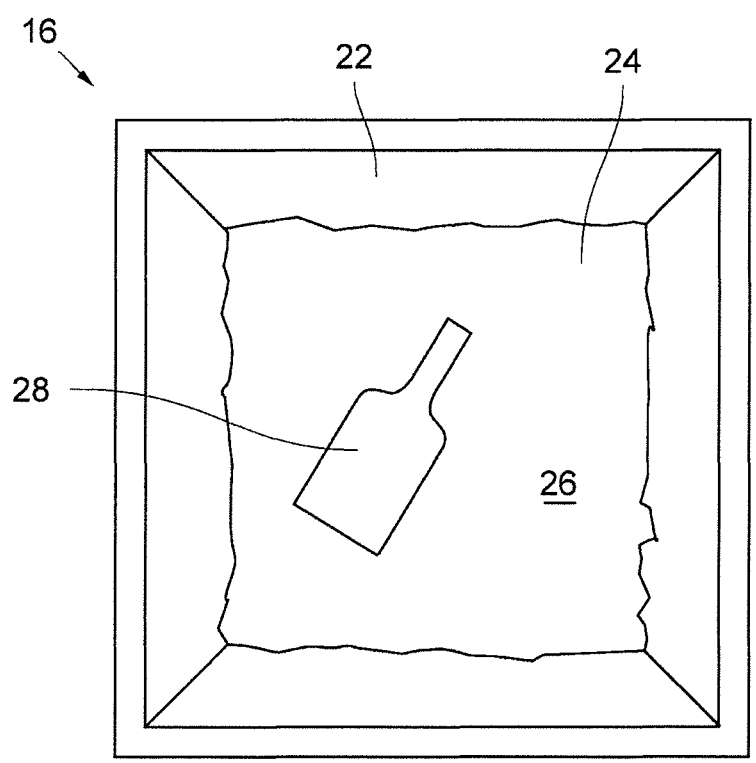
FIG. 2 shows schematically an exemplary image of the first camera of the camera system of the disposal vehicle from FIG. 1.

One such picture is shown in FIG. 2. Wastes are present in the interior 22 of the waste container 16, i.e., contents 24 which may be composed of various substances. These substances can be divided into different classes, namely, into at least permitted substances which can be recycled and substances representing contaminants, i.e., unpermitted substances. The term "permitted" shall refer to the fact that the respective substances have been properly sorted into a waste container 16 provided for this, so that they can be taken to a collection site provided for their recycling. The contaminants, on the other hand, are substances which have not been properly sorted and therefore cannot be recycled at the designated collection site.

For example, this will be explained with the aid of bio-waste. As is known, special compost bins exist for the collection of primarily compostable waste, generally known as bio-waste, and for its separation from other types of wastes, which are collected in other waste containers. Thus, bio-waste is a permissible content for a compost bin, while other wastes are contaminants. The contents 24 of the waste container 16 of FIG. 2 consist predominantly of bio-waste 26, however a foreign object is visible in the top view, namely a glass bottle 28, for example, which represents a contaminant.

The disposal vehicle 10 comprises a data processing unit, not otherwise shown, for analysis of the images of the first camera 18, wherein the analysis involves a classification of the images in terms of content by means of a neural network, in this instance, a convolutional neural network (CNN). In this way, the images of the first camera 18 can be classified in terms of content. The image of the first camera 18 from FIG. 2 may be classified or assigned to the substance (contaminant) of "glass", since the corresponding contaminant has been identified in it. But such a classification can also be limited to classifying the depicted image in terms of whether or not it contains a contaminant, without identifying the type of contaminant present (i.e., glass in this case). In this way, it is possible to recognize at least the existence of contaminants in the overall content of a waste container 16 in its receiving position at the emptying device 14.

If an image is classified as containing at least one contaminant, the waste container 16 whose content 24 is depicted will be identified as contaminated. It is then possible to decide as to the further handling of this contaminated waste container 16. For example, it is conceivable in the case of identifying a contaminated waste container 16 on the basis of the image registered by the first camera 18 to relay a signal by the data processing unit to the emptying device 14, so that no movement of the contaminated waste container 16 into the emptying position will occur or will be prevented. In this way, the contaminated content 24, containing contaminants, is prevented from getting into the wastes already present in the waste collection room 12 and becoming mingled with them. Instead, the emptying of the contaminated waste container 16 can be denied. The ending or preventing of the movement of the waste container 16 into the emptying position will also be termed a "dump stop".

Figure 3:
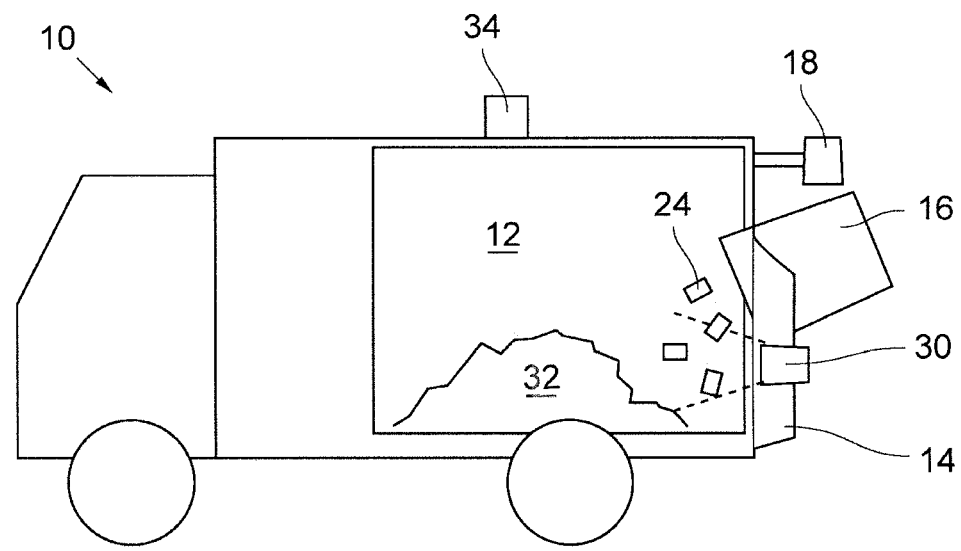
FIG. 3 is a further view of the disposal vehicle of FIG. 1 in an emptying position of a waste container received on it.

From the position in FIG. 1, the waste container 16 can be moved by the emptying device 14 into the emptying position shown in FIG. 3, in which the waste container 16 is tilted and its content 24 emptied into the waste collection room 12. During the emptying, the content 24 falls freely into the waste collection room 12. A second camera 30 arranged in the region of the emptying device 14 beneath the emptying position is adapted to take pictures of the content 24 of the waste container 16 during the emptying process, in particular a sequence of images, such as a video sequence. The images of the second camera 30—like the images of the first camera 18—can also be subjected by the data processing unit to an analysis by means of the neural network, so that the images of the second camera 30 are classified in terms of identified contents, i.e., permitted substances and contaminants. In this case as well, one or more images will be classified in terms of contents, and if the image or images contain a contaminant, the waste container 16 will be recognized as being contaminated and further handled accordingly.

The second camera 30 identifies in a recorded image sequence, e.g., the glass bottle 28 represented in FIG. 2 as a contaminant in free fall during the emptying and the image or images of the second camera 30 are classified accordingly. Even if the content 24 of the contaminated waste container 16 has already gotten into the content 32 of emptying events already performed for previous waste containers inside the waste collection room 12, the analysis of the images of the second camera 30 will be useful. These will serve for determining a cumulative contaminant fraction of the overall content 32 of the waste collection room 12 from the contaminant fraction of the content of a contaminated waste container 16 and the contaminant fractions of emptying events already performed for other waste containers.

These contaminant fractions may be, for example, volume fractions of the contaminant in the content 32. This may be estimated from the images recorded, i.e., determined at least approximately. In some cases, an upper limit value may be set for a permitted cumulative contaminant fraction of the content 32 of the waste collection room 12. If this limit value is exceeded, a signal may be sent to the crew of the disposal vehicle 12, so that a decision can be made whether the content of the waste collection room 12 should be taken to a designated collection site, such as a composting plant for bio-waste, or to a different collection site, where the collected waste will be handled differently.

In some instances, the data processing unit is adapted to determine a cumulative contaminant fraction of the content of the waste collection room 12 from the fraction of emptying events of contaminated waste containers 16 out of the total number of emptying events already performed.

In this case, it is only determined how many contaminated waste containers have been emptied and this number is set in a ratio with the total number of emptying events already performed. From this, the degree of contamination of the content of the waste collection room 12 can be determined at least approximately. This procedure might be easier to carry out.

The disposal vehicle 12 moreover comprises means of determining its geographical location, namely, a GPS (Global Positioning System) receiver 34, by which corresponding location data can be generated. The data processing unit is adapted to correlate these location data with the identifier of the waste container 16. In this way, the location of a waste container 16 can be determined, as long as the location data have been associated with the identifier of a waste container 16 coupled to the disposal vehicle 10. Furthermore, the location data and the identifier of a waste container 16 can be associated with data representing the contaminant fraction in the content 24 of a particular waste container 16. The sites where waste containers 16 are located can thus be correlated with the contaminant fractions in their contents 24. If the location data and correlated identifiers of waste containers 16 are relayed to a central data management unit, together with the respective contaminant fractions of the contents of the waste containers 16, as can be done in the present waste disposal system, this central data management unit can determine a geographical density distribution of the contaminant fractions, i.e., it is possible to determine regions, for example, in which the contaminant fractions in the waste containers 16 positioned there are higher than in other regions. Thus, a kind of "heat map" of the contaminant fractions can be created and visualized.

Such a mapping of the contaminant fractions can serve for specific discussions with the waste producers in regions with elevated occurrence of contaminants in the contents of their waste containers 16, i.e., to better inform them about waste separation or to warn them to carry out a better waste separation, perhaps by personalized letters. The images of the content 24 of the contaminated waste container 16 as recorded by the first camera 18 or the second camera 30 may be enclosed with the letters.

Thus, measures can be initiated, based on the mapping of the contaminant occurrence, to boost the quality of the wastes in terms of their recycling capability for useful substances. Other measures can also be considered, such as stricter checking of the waste containers 16 prior to the emptying.

The central data management unit may be outfitted to verify the result of the analysis of the images of the content 24 of a waste container 16 as recorded by the first camera 18 or the second camera 30 by a supplemental analysis. For example, if a waste container 16 is identified as being contaminated by the data processing unit of the disposal vehicle 10 by means of a first neural network on the basis of the analysis of an image of the first camera 18 (and/or multiple images of the second camera 30), the central data management unit 38 to which this image or these images have been relayed can undertake a further analysis by means of a second neural network, in order to verify the classification by the first neural network. The first neural network and the second neural network may be different from each other. Only in event of a positive verification, i.e., a confirmation of the result, will steps be taken, such as personalized letters, stricter inspections, or the like, so that a fine can be assessed through the memorized image and its matching up via the RFID with the citizen, i.e., the waste producer, or the citizen can be charged a fee for additional handling (sorting) of the wastes.

The contact between the data processing units which are installed in the disposal vehicles 10 of a fleet of the waste disposal system and a central data management unit which is stationary occurs in wireless manner, e.g., through known mobile radio standards.

Figure 4:
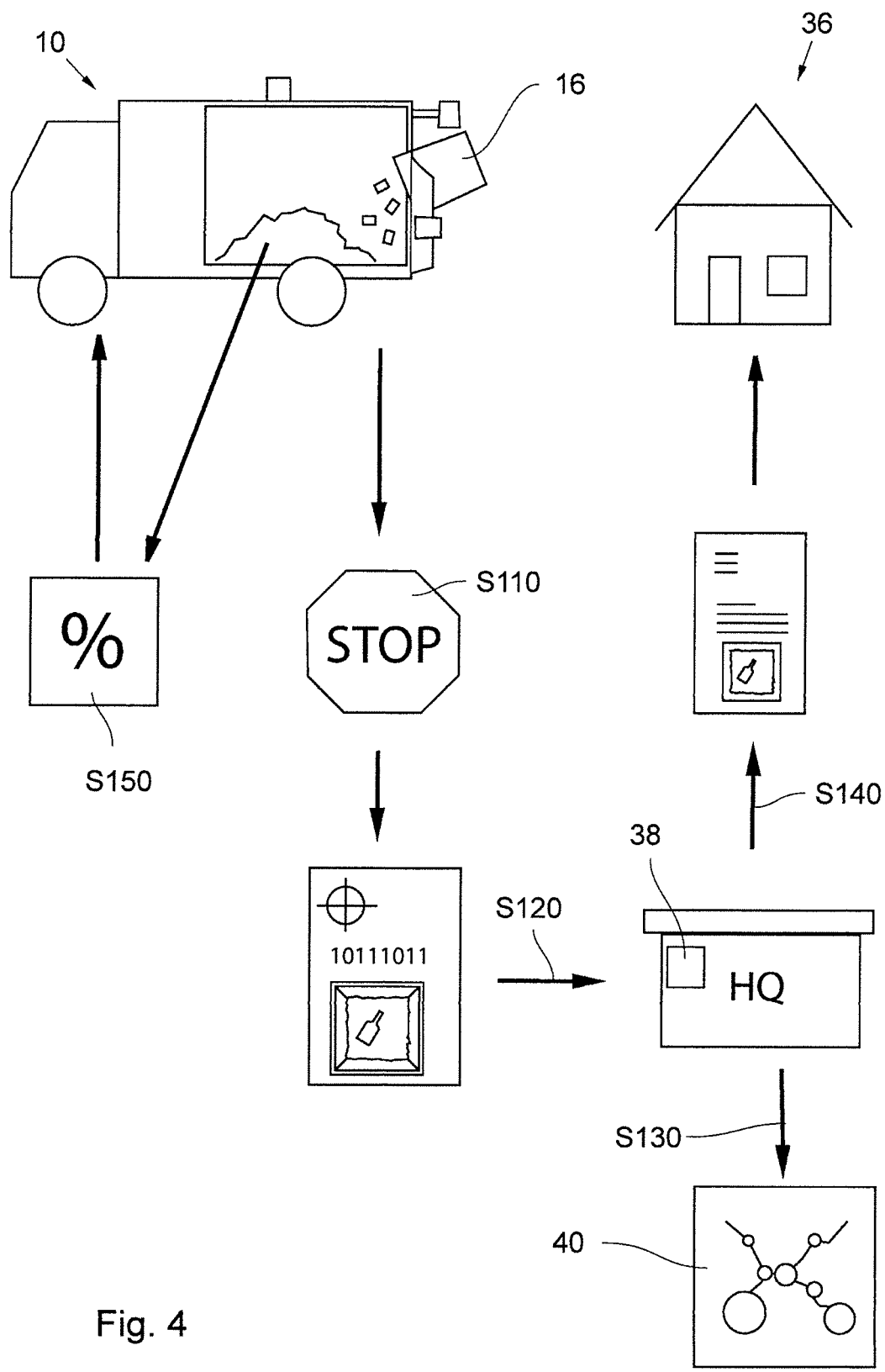
FIG. 4 is a flow chart to show one embodiment of the method according to the invention making use of a disposal vehicle per FIGS. 1 and 3.

The diagram in FIG. 4 shows the flow of a method according to the invention for contaminant detection in waste containers with the aid of a waste disposal systems comprising the disposal vehicle 10 from FIGS. 1 and 3.

If a waste container 16 of a household 36 is placed in the receiving position of the emptying device 14 of the disposal vehicle 10, the first camera 18 will take a picture of the content 24 of the waste container 16 (see FIG. 2). The data processing unit of the disposal vehicle 10 analyzes this image of the first camera 18 and classifies it in terms of contents with the aid of a neural network, as described above.

If a contaminant 28 is contained in the image and the image of the first camera 18 is classified accordingly, the waste container 16 will be identified as being contaminated and a dump stop will be carried out (step S110). No movement of the waste container 16 to the emptying position will be performed. Instead, the contaminant fraction of the contents 24 of the contaminated waste container 16 will be ascertained by the data processing unit of the disposal vehicle 10 and sent wirelessly, together with location data representing the geographical location of the disposal vehicle 10 with the waste container 16 received in it and a likewise ascertained identifier of the waste container 16 to a central data management unit 38 at a central station (HQ) (step S120).

From the location data of various disposal vehicles 10, the correlated identifiers of waste containers 16 and the contaminant fractions of the contents 24 of these waste containers 16, the data management unit 38 can determine a geographical density distribution 40 of the contaminant fractions (step S130).

Moreover, the individual waste producers, namely, the households 36 with which the waste containers 16 are associated, can be contacted individually by the central station, for example by means of a letter, and a positive or negative sanction can be imposed. For example, it is possible to provide the households 36 with additional information about proper waste separation, to warn them to improve their behavior in this regard, and so forth, possibly together with proof as to the contaminants 28 found in the contents 24 in the form of photos of the cameras 18 or 30 (step S140). This can be done in automated manner by means of the data management unit 38.

While the contents of a waste container 16 are being emptied into the waste collection room 12, the second camera 30 can furthermore record images of the contents of the waste container 16, as described above, and the contaminant fraction of the contents 24 of a contaminated waste container 16 can be determined by the data processing unit of the disposal vehicle 10. An emptying of a contaminated waste container 16 may occur, e.g., if the contamination is not identified in the top view per FIG. 2 by the first camera 18, perhaps when a contaminant 28 is hidden in the contents 24 of the waste container 16, and therefore no dump stop is triggered.

If multiple waste containers 16 are emptied in succession into the waste collection room 12, it is possible to determine a cumulative contaminant fraction of the total contents of the waste collection room 12 from the ascertained contaminant fractions of these already performed emptying events of multiple waste containers 16 (step S150). This cumulative contaminant fraction can be communicated by means of a display to the crew of the disposal vehicle 10, so that they can respond, for example, when the cumulative contaminant fraction becomes too large, especially when it passes a given limit value. The cumulative contaminant fraction may be an indication of the percentage of contamination, for example. The crew can then decide whether to drive the disposal vehicle 10 to a given collection site, where the permissible contents will be used (e.g., a composting plant in the case of a collection of biological waste), or in the case of too high a cumulative contaminant fraction the contents of the waste collection room 12 will be handled alternatively, for example, in a trash incinerator.

The individual contaminant fractions of the contents of the waste containers 16 that are determined by images of the second camera 30 can also be correlated with the individual identifiers of the waste containers 16, in order to match up the individual contamination of the waste container 16 with the waste producers, i.e., the households 36. The identifiers of the waste containers 16 can be correlated with the location data of the disposal vehicle 10 and matched up in turn with the respective contaminant fractions of the waste container 16. The data processing unit of the disposal vehicle 10 can then send the location data, the correlated identifiers of the waste containers 16, and the respective contaminant fractions to the central data management unit 38, similar to step S120. As already described above in connection with the first camera 18, this can then individually contact the households 36 with which the waste containers 16 are associated and send out informational or warning letters, for example.

The central data management unit 38 can if necessary, subject the images sent to it from the first camera and/or the second camera 30 (together with the location data and the identifiers of the waste containers 16) to an additional analysis, in order to verify the result of the analysis of the data processing unit of the disposal vehicle 10. For example, if the data processing unit of the disposal vehicle 10 analyzes an image of the first camera 18 (and/or multiple images of the second camera 30) by means of a first neural network and identifies a waste container 16 as being contaminated, this image of the first camera 18 (and/or the images of the second camera 30) will be sent to the central data management unit 38 (together with the location data and the identifiers of the waste containers 16 identified as being contaminated), and the central data management unit 38 will analyze this image of the first camera 18 (and/or the images of the second camera 30) by means of a second neural network, in order to verify the contamination of this waste container 16, i.e., the result of the analysis of the first neural network. The first neural network and the second neural network may be different from each other.

Thus, both data of the first camera 16 and data of the second camera 30 can be used to evaluate the contaminant fractions so determined.

What is claimed is:

1. A waste disposal system for contaminant detection in waste containers, comprising at least one disposal vehicle comprising:
   a waste collection room,
   an emptying device, adapted to receive a waste container in a receiving position and to move it from the receiving position to an emptying position in which contents of the waste container are emptied into the waste collection room,
   a camera system, adapted to detect the contents of the waste container, the camera system comprising:
      a first camera to record at least one image of the contents of the waste container prior to the emptying in a top view and
      a second camera for recording a sequence of images of the contents of the waste container during the emptying, and
   a data processing unit for analysis of images of the first camera and/or the second camera, the analysis involving a classification of the images in terms of identified contents by a neural network.

2. The waste disposal system according to claim 1, wherein the data processing unit is adapted to classify the images in terms of whether an image contains or does not contain at least one contaminant, and if a contaminant is present, to identify the waste container whose contents are depicted as a contaminated one.

3. The waste disposal system according to claim 2, wherein the data processing unit, in event of identifying a contaminated waste container, based on an image recorded by the first camera, is adapted to relay a signal to the emptying device, by which a movement of this waste container to the emptying position is terminated or prevented.

4. The waste disposal system according to claim 2, wherein the data processing unit is adapted to determine the fraction of contaminants of the contents of a contaminated waste container.

5. The waste disposal system according to claim 4, wherein the data processing unit is adapted to determine, from the contaminant fractions determined for already completed emptying of multiple waste containers, a cumulative contaminant fraction of the contents of the waste collection room.

6. The waste disposal system according to claim 4, wherein the data processing unit is adapted to determine, from the fraction of emptying of contaminated waste containers in the total number of emptying events already performed, a cumulative contaminant fraction of the contents of the waste collection room.

7. The waste disposal system according to claim 1, wherein the disposal vehicle comprises an identification arrangement for determining an identifier of a waste container.

8. The waste disposal system according to claim 7, wherein the disposal vehicle comprises an arrangement for determining its geographical location and for generating corresponding location data, and the data processing unit is adapted to correlate the location data with the identifier of a waste container.

9. The waste disposal system according to claim 8, further comprising a central data management unit and a communication arrangement for communication between the central data management unit and the data processing unit of the disposal vehicle,
   wherein the data processing unit is adapted to send location data and correlated identifiers of waste containers together with respective contaminant fractions of the contents of the waste containers to the central data management unit, and
   wherein the central data management unit is adapted to determine a geographical density distribution of the contaminant fractions.

10. The waste disposal system according to claim 9, wherein the central data management unit is adapted to analyze images of the first camera and/or the second camera, the analysis involving a classification of the images in terms of identified contents by a further neural network.

11. A method for contaminant detection in waste containers, comprising the following steps:
   receiving of a waste container by a disposal vehicle in a receiving position,
   recording of at least one image of the contents of the waste container in the receiving position by a first camera in a top view,
   moving of the waste container to an emptying position, in which the contents of the waste container are emptied into a waste collection room of the disposal vehicle,
   recording of a sequence of images of the contents of the waste container during the emptying by a second camera, and
   analysis of the images of the first camera and/or the second camera, involving a classification of the images in terms of contents by a neural network.

12. The method according to claim 11, wherein the analysis step includes classifying the images in terms of whether or not an image contains at least one contaminant, and if a contaminant is present, then identifying the waste container whose contents are depicted as a contaminated one.

13. The method according to claim 12, wherein in event of the identifying of a contaminated waste container based on an image recorded by the first camera, moving of this waste container to the emptying position is terminated or prevented.

14. The method according to claim 11, further comprising the step of determining a contaminant fraction of the contents of a contaminated waste container.

15. The method according to claim 14, further comprising the step of determining a cumulative contaminant fraction of the contents of the waste collection room from the ascertained contaminant fractions of emptying events already performed for multiple waste containers.

16. The method according to claim 11, further comprising the step of determining a cumulative contaminant fraction of the contents of the waste collection room from the fraction of emptying of contaminated waste containers out of the total number of emptying events already performed.

17. The method according to claim 11, further comprising the step of determining one identifier of a waste container, by which the waste container is identified.

18. The method according to claim 17, further comprising the step of determining the geographical location of the disposal vehicle and correlating location data corresponding to this geographical location with the identifier of a waste container.

19. The method according to claim 18, further comprising the step of sending location data and correlated identifiers of waste containers along with the respective contaminant fractions of the contents of the waste containers to a central data management unit and ascertaining a geographical density distribution of the contaminant fractions.

20. The method according to claim 19, further comprising the step of performing by the central data management unit an analysis of the images of the first camera and/or the second camera, involving a classification of the images in terms of identified contents, by a further neural network, in order to verify the result of the analysis of these images by the neural network of the disposal vehicle.

* * * * *